Jan. 2 1968     L. SCHLEBUSCH     3,361,947
ROTARY AND RECIPROCATING MOTOR DRIVE
MEANS FOR VIBRATING CENTRIFUGE
Filed Feb. 7, 1964     2 Sheets-Sheet 1
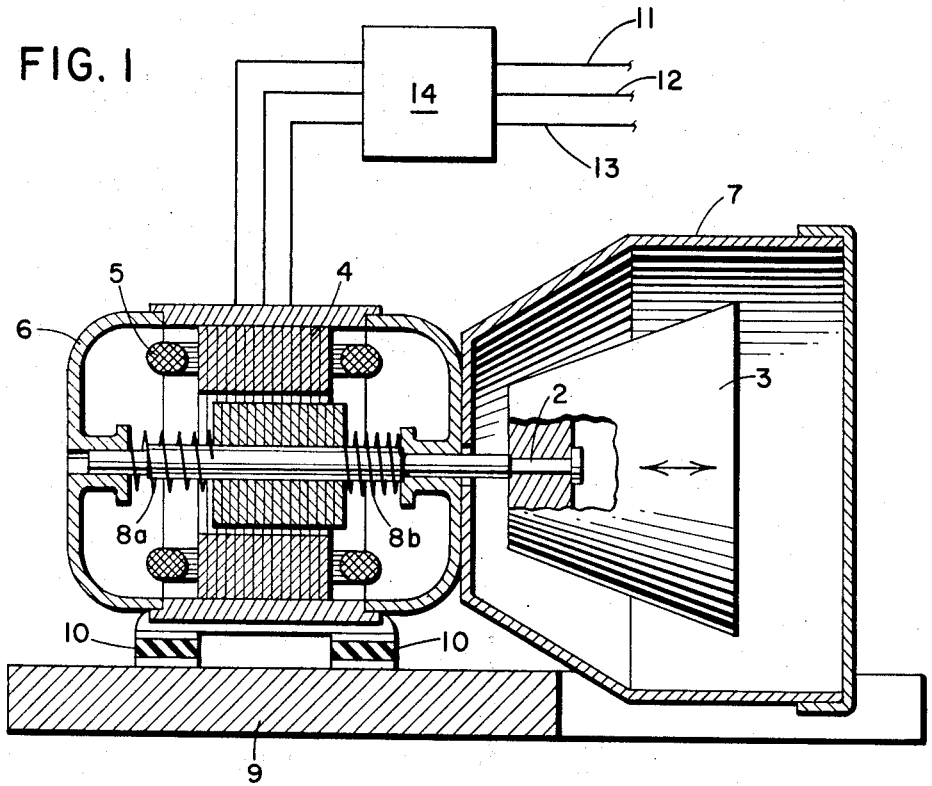
FIG. 1
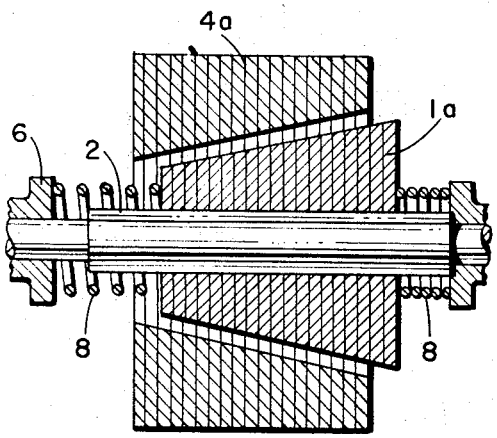 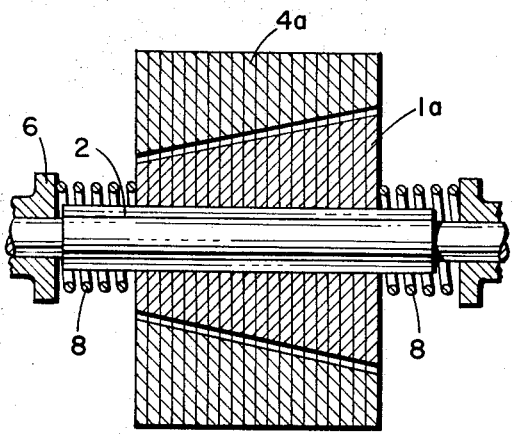
FIG. 2A     FIG. 2B
INVENTOR
LUDWIG SCHLEBUSCH
BY *Stevens, Davis, Miller & Mosher*
ATTORNEYS Jan. 2 1968     L. SCHLEBUSCH     3,361,947
ROTARY AND RECIPROCATING MOTOR DRIVE
MEANS FOR VIBRATING CENTRIFUGE
Filed Feb. 7, 1964     2 Sheets-Sheet 2

INVENTOR
LUDWIG SCHLEBUSCH

BY *Stevens, Davis, Miller & Mosher*
ATTORNEYS

United States Patent Office 3,361,947
Patented Jan. 2, 1968

3,361,947
ROTARY AND RECIPROCATING MOTOR DRIVE MEANS FOR VIBRATING CENTRIFUGE
Ludwig Schlebusch, Mulheim (Ruhr), Germany, assignor to Siebtechnik G.m.b.H., Mulheim (Ruhr), Germany
Filed Feb. 7, 1964, Ser. No. 343,251
Claims priority, application Germany, Feb. 13, 1963, S 83,720
9 Claims. (Cl. 318—115)

ABSTRACT OF THE DISCLOSURE

A driving means for a vibrating centrifuge or the like comprising a driving motor having a stator, a rotor, and a shaft securing a centrifugal drum to the rotor. The rotor is mounted in the stator in such a manner as to be both rotatably and axially movable with respect to the stator. Means for controlling the electric field between the rotor and stator so that an axial movement is imparted to the rotor during each rotation thereof.

The invention relates to driving means for vibratory centrifuges with a centrifugal drum mounted on the rotating shaft of a driving motor.

Several types of vibratory centrifuges are known in the art. The vibrations in the direction of the axis of the motor of these known devices are generated either by mechanical means such as an eccentric drive or the like, or by means of electromagnets supplied with a current of alternating amplitude.

The purely mechanical means has the drawback of wearing out comparatively soon and being of cumbersome construction. Electromagnets are generally more suitable, but have to be installed as additional devices and also require special armatures attached to the drum to be vibrated so that the magnets can act on these armatures. Consequently, the employment of the beforementioned arrangements increases the total costs considerably and their degree of efficiency is also very low.

It is therefore an object of this invention to provide a driving means for a vibratory centrifuge that exhibits a higher degree of efficiency than heretofore known devices and is also of simple construction.

It is a further object of the invention to provide a driving means for a vibratory centrifuge that allows convenient variation of the vibration frequency of the centrifuge.

Another object of this invention is to provide driving means by which the rotating speed of the centrifuge can be maintained substantially constant independently of the vibratory movement of the drum and independently of the frequency of the vibration.

Other objects and advantages of this invention will be apparent upon consideration of the following detailed description of a preferred embodiment thereof in conjunction with the accompanying drawings wherein:

FIG. 1 is a diagrammatic longitudinal cross-section through the complete assembly of the driving means and the centrifugal drum;

FIGURE 2A is a longitudinal cross-section through a conically shaped rotor and stator assembly shown in the deenergized position;

FIGURE 2B is similar to FIGURE 2A but shows the energized position;

Figure 3A:
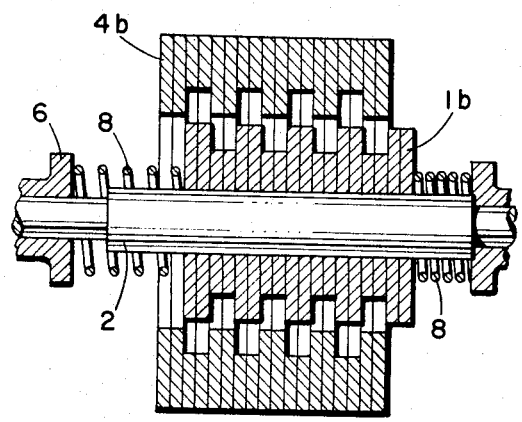
FIGURE 3A is a longitudinal cross-section through a cylindrical rotor and stator assembly, with peripheral grooves provided in both members, shown in the deenergized position; and, FIGURE 3B is similar to FIGURE 3A but shows the energized position.

Referring now in detail to the drawings, reference number 1 in FIG. 1 designates a rotor mounted on a shaft 2. At one end of a shaft 2 a centrifugal drum 3 is rigidly attached. The rotor 1 forms part of an electrical motor 6 which here is shown as a three phase motor but could likewise be of another type such as a direct current motor. The motor 6 contains the stator 4 with corresponding coil 5 and is rigidly secured to a centrifuge housing 7. The rotor 1 is supported resiliently within the motor housing 6 by means of the springs 8a and 8b surrounding both ends of the shaft 2 projecting from rotor 1 and adjacent the front faces of the rotor 1 on one end and opposite faces of the motor housing 6 on the other end. The motor 6 is mounted on a foundation 9 by vibration-absorbing rubber blocks 10.

Figure 4:
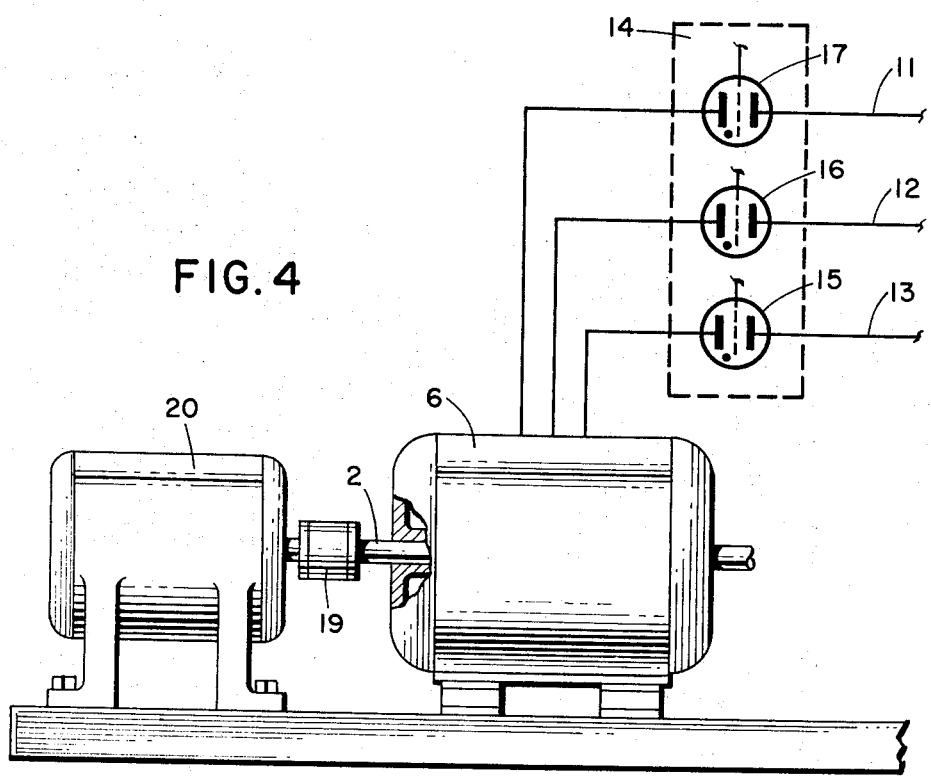
FIG. 4 shows diagrammatically a further embodiment of the invention.

The motor 6 is connected to a power supply source by conductors 11, 12 and 13. Interconnected between these conductors 11, 12 and 13 is a control device 14 which is adapted to periodically interrupt the current flowing through the conductors. Means to interrupt the current flow by control device 14 can be conventional thyratrons 15, 16 and 17, as illustrated in FIG. 4 or conventional mechanical rotating mercury switches.

The operation of the driving means according to this invention is as follows: One of the springs 8a, 8b is biased in a manner such that the rotor 1 normally is not in axial alignment with the stator 4. As soon as a current flows through the motor coil 5 the magnetic field forces thereby generated pull the rotor 1 towards the center of stator 4 against the oppositely acting force of the springs 8a and 8b. When the current is interrupted again the rotor 1 returns to its off center position as shown in FIG. 1.

Consequently, by periodically interrupting the current passing the control device 14 the rotor 1 can be reciprocated accordingly and thus generate the desired vibratory movement of the drum 3 which is coupled to the rotor shaft 2.

In operating the driving motor, energy is first supplied to the motor until it has reached its full rotating speed, and thereupon the current is interrupted periodically, thus feeding the motor only with current pulses. Between these pulses the rotor reciprocates in resonance or according to an arbitrary frequency.

A change of the rotating speed dependent on the load can be effected by varying the relation between the time period during which the current is flowing and the time period during which the current is interrupted. The frequency of the vibration of the centrifugal drum can be easily varied by change of the frequency of interrupting the current. A variation of the rotating speed and the vibratory frequency thus can be effected by the same control device 14 in a very convenient manner. It should be stressed that the above mentioned means used in the control device also are comparatively simple and inexpensive.

In case it is desired to maintain the rotating speed of the rotor 1 substantially constant, one end of shaft 2 can be coupled to an additional motor 20 as illustrated in FIG. 4. This second motor runs with a constant rotating speed and is adapted to keep the speed of rotor 1 constant independently of the vibrating frequency. To allow the necessary free axial movement of shaft 2 a coupling 19 elastical in longitudinal direction is provided between the two connected shaft ends of motors 6 and 20.

Figure 3B:
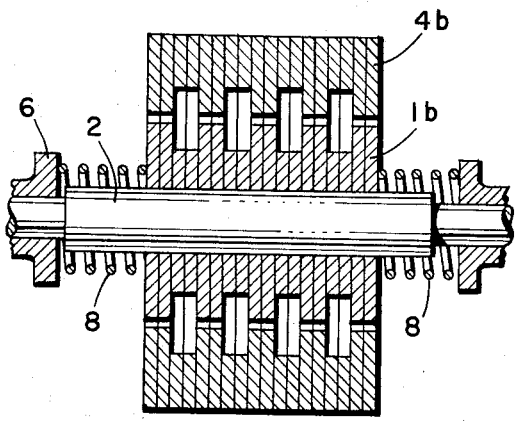

In order to enforce the axial magnetic field force, the rotor and the stator may be made in special shapes. In FIGURES 2A and 2B a conical structure 1a, 4a is shown. FIGURES 3A and 3B depict cylindrical arrangement with the grooves 1b, 4b for the rotor and the stator.

What is claimed is:

1. Driving means for vibrating centrifuge comprising an electrical driving motor with a stator, a rotor and a rotating shaft, said rotor secured to said shaft, said rotor and shaft being axially movable in relationship to said stator, a centrifugal drum attached to said shaft, resilient means for controlling the axial movement of said rotor and means for controlling electrical field forces acting between said rotor and said stator, said control means and resilient means adapted to periodically effect axial movements of said rotor whereby the interaction between the rotor and stator imparts an axial movement to said shaft during the rotation thereof.

2. Driving means according to claim 1, wherein said control means is adapted to generate pulsations of the current feeding said motor, the frequency of said pulsations being in resonance with the axial vibrating frequency of said rotor.

3. Driving means according to claim 1, wherein said control means are adapted to generate pulsations of a current feeding said motor, said pulsations adapted to reciprocate said rotor in relationship to said stator with an arbitrary frequency.

4. Driving means according to claim 1, wherein said rotor is of cylindrical shape.

5. Driving means according to claim 1, wherein said rotor has a conical outer surface and the stator has a conical inner surface corresponding to the shape of said conical rotor.

6. Driving means according to claim 1, wherein said motor has a cylindrical rotor having peripheral grooves, and a stator with a cylindrical inner surface, said stator being provided with peripheral grooves registering with said grooves of said rotor.

7. Driving means according to claim 1, wherein said control means for the periodical interruption of the current feeding said motor are thyratrons.

8. Driving means according to claim 1, wherein said control means for the periodical interruption of the current feeding said motor are rotating mercury switches.

9. Driving means according to claim 1, comprising in addition a second driving motor and a coupling, said second driving motor being connected to said shaft of said first driving motor by means of said coupling, said second motor adapted to maintain a constant speed of said rotor independent of the axial movements of said rotor.

References Cited

UNITED STATES PATENTS

| | | | |
|---|---|---|---|
| 1,873,193 | 8/1932 | Frenell | 318—341 X |
| 2,384,987 | 9/1945 | Dudley | 318—35 X |
| 2,577,647 | 12/1951 | Clark | 68—23 X |
| 2,694,781 | 11/1954 | Hinz | 310—209 X |
| 3,184,933 | 5/1965 | Gaugler | 318—35 X |
| 3,216,226 | 11/1965 | Alger et al. | 318—35 X |
| 3,229,179 | 1/1966 | Hetzel | 318—341 X |

FOREIGN PATENTS 634,360    3/1950    Great Britain.

ORIS L. RADER, *Primary Examiner.*

T. LYNCH, *Assistant Examiner.*